June 4, 1935.  R. J. WILLIAMSON  2,003,619
PIPE CUTTING DEVICE
Filed May 10, 1933

INVENTOR
Ralph J. Williamson
BY
ATTORNEY

Patented June 4, 1935

2,003,619

UNITED STATES PATENT OFFICE 2,003,619

PIPE CUTTING DEVICE

Ralph J. Williamson, Milton, Mass., assignor to Trimont Manufacturing Co., Inc., Roxbury, Mass., a corporation of Massachusetts Application May 10, 1933, Serial No. 670,268

1 Claim. (Cl. 29—67)

This invention relates to pipe cutting devices and is more particularly directed to devices of this character for cutting metal pipes.

In recent years there has been a growing demand for soft metal pipe such for instance as brass or copper pipes and since these pipes are furnished in various lengths it becomes desirable at times to cut the pipe in accordance with the circumstances of installation. On the other hand the walls of a soft metal pipe are usually thin and readily distorted during the cutting operation, a condition which renders the pipe unsuitable for use without first straightening the walls thereof. To effectively cut a length of relatively soft metal pipe the entire circumferential area of the pipe should be clamped or supported in such manner that the cutting operation will not cause distortion of the walls of the pipe or form undesirable burrs around the edge of the cut section.

One of the objects of the present invention is to provide a pipe cutting device of simple construction which will be effective in so holding the pipe during the cutting operation that indentations or deflections in the walls of the pipe will be prevented.

The invention and novel features thereof will best be made clear from the following description and accompanying drawing of one good form thereof.

In the drawing:—

Figure 1:
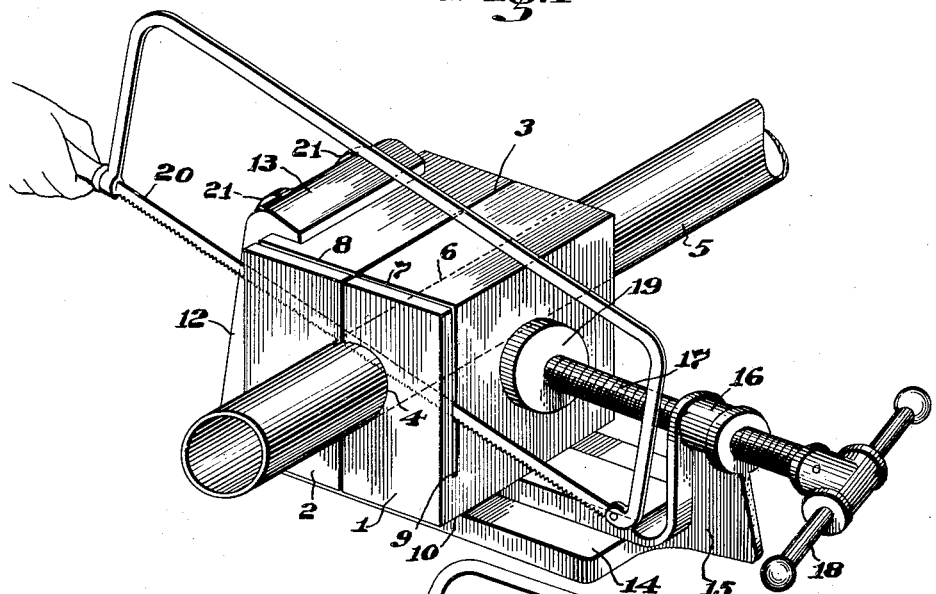
Fig. 1 is a perspective view showing the pipe cutting device and the relation of parts during the pipe cutting operation.
Figures 2, 3:
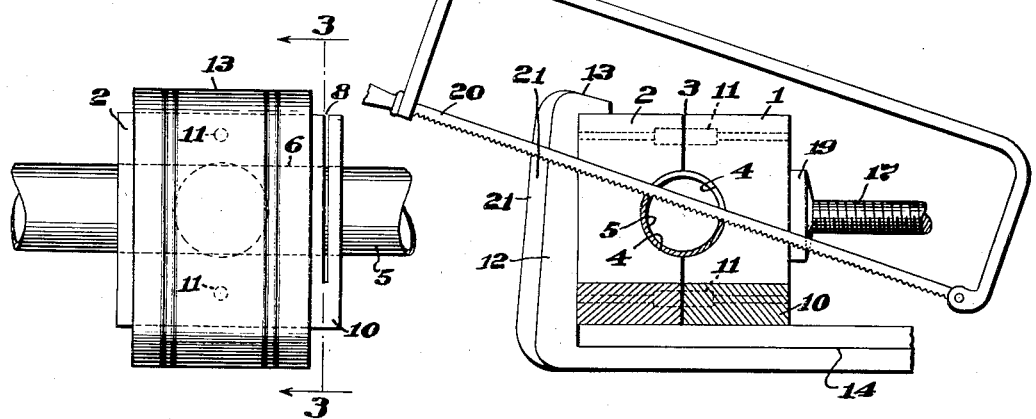
Fig. 2 is a side elevation looking from the left of Fig. 1.
Fig. 3 is a section on the line 3—3 of Fig. 2.

The two metal blocks 1 and 2 are of similar construction with the line of separation at 3 between the two, and each block is provided with a semi-cylindrical opening extending longitudinally of the block, as indicated at 4, the result being that when a pipe 5 is engaged with the semi-cylindrical openings of the two blocks and the blocks are themselves forced towards each other a substantial length of the pipe 5, as indicated at 6, will be clamped between the two blocks, so that the pipe 5 will receive an extended support about its exterior surface.

Each metal block 1 and 2 is provided with a saw kerf or slot 7, 8 near one end and each of the saw kerfs or slots extends in intersecting relation with the semi-cylindrical openings 4 and terminates at a point 9. In other words, the saw kerfs or slots 7 and 8 while extending across or in intersecting relation with the semi-cylindrical openings in the two blocks terminate short of the opposite wall 10, the effect being that while the saw kerfs form a relatively thin portion of each block separated therefrom for a part of its termination, such part will be substantially rigid with the block in which it is formed.

In order that the saw kerfs or slots 7 and 8 may be operatively positioned to form a substantially continuous slot through the two blocks there are positioning pins 11 which act to align the two blocks with the saw kerfs of each in alignment.

In connection with the two metal blocks just described there is a holding and clamping device, one end portion 12 of which forms a foot having an overhanging lip 13 to engage and hold one of the blocks and a base portion 14 connects the foot 12 with the opposite end of the holding and clamping device. At such opposite end the holding and clamping device is provided an upwardly projecting portion 15 having a threaded member 16 in which is threaded the clamping screw 17, suitable handles 18 being provided for turning the screw to and from its clamping position.

The screw 17 is provided with a disk portion 19 adapted to bear on one of the blocks, as shown, with the result that when the two blocks are placed in the clamping and holding device, as indicated in Fig. 1, the clamping screw 17 may be manipulated to exert pressure upon the blocks in a direction parallel to the plane of the saw kerfs or slots 7 and 8 to clamp the pipe 5 securely within the semi-cylindrical openings 4 of the two blocks. The effect of this is that no disturbing pressure is exerted upon the side members of the saw kerfs or slots which might interfere with the proper manipulation of a cutting tool or saw 20.

The holding and clamping device has the foot portion 12 thereof at one side of the saw kerfs, as indicated in Fig. 1 and extending from this point longitudinally of the holding and clamping device are the ribs 21 which act to strengthen the holding and clamping device.

From the construction described it will be apparent that the present invention provides a simple and compact pipe cutting device which may be readily transported from place to place and that when a pipe is placed between the two blocks, as indicated, and the pressure screw 17 exerts its pressure parallel with the plane of the saw kerfs the entire cylindrical surface of the pipe will be clamped in the semi-cylindrical openings 5 of the two blocks thereby imparting a sustaining support for the walls of the pipe during the cutting operation and insomuch as the pressure of the screw 17 is in a direction parallel of the plane of the saw kerfs 7 and 8 no distortion of the walls of the saw kerfs or slots results so that a cutting implement such as the saw 20 may not be disturbed during its cutting operation.

What is claimed is:—

In a pipe cutting device, the combination of two relatively movable metal blocks each having a complemental cylindrical opening of a radius for closely engaging the exterior of a pipe for a substantial length thereof, a block supporting base having an upwardly extending block holding member provided with an overhanging lip which engages the top of and holds one of the blocks in operative position on the base, a pressure device acting in opposition to the upwardly extending lipped member, and each of the metal blocks having a saw kerf or slot extending in a plane at one side of the upwardly extending lipped member and the pressure device.

RALPH J. WILLIAMSON.